United States Patent [19]
Naber et al.

[11] Patent Number: 6,087,409
[45] Date of Patent: Jul. 11, 2000

[54] PRODUCTION OF RIGID POLYURETHANE FOAMS

[75] Inventors: Bernhard Naber, Schwarzheide; Werner Schmiade, Lembruch; Michael Gassan, Senftenberg, all of Germany

[73] Assignee: BASF Aktiengesellschaft, Ludwigshafen, Germany

[21] Appl. No.: 09/069,412

[22] Filed: Apr. 29, 1998

[30] Foreign Application Priority Data

Apr. 29, 1997 [DE] Germany .............................. 197 18 018

[51] Int. Cl.$^7$ .............................. C08J 11/04; C08G 18/04
[52] U.S. Cl. .............................. 521/155; 521/49; 521/137; 521/170; 521/174
[58] Field of Search .................................... 521/137, 170, 521/174, 49, 155

[56] References Cited

U.S. PATENT DOCUMENTS

| | | |
|---|---|---|
| 4,511,680 | 4/1985 | Niederdellmann et al. . |
| 5,300,530 | 4/1994 | Machado et al. . |
| 5,357,006 | 10/1994 | Gassan et al. . |
| 5,556,889 | 9/1996 | Naber et al. . |

FOREIGN PATENT DOCUMENTS

| | | |
|---|---|---|
| 0 592 952 A1 | 4/1994 | European Pat. Off. . |
| 718349 | 6/1996 | European Pat. Off. . |
| 3232461 | 3/1984 | Germany . |
| 44 11 864 A1 | 4/1994 | Germany . |

*Primary Examiner*—John M. Cooney, Jr.
*Attorney, Agent, or Firm*—Fernando A. Borrego

[57] ABSTRACT

In a process for producing rigid polyurethane foams by reacting a) polyisocyanates
b) compounds containing at least two hydrogen atoms capable of reacting with isocyanate groups, in the presence of
c) catalysts,
d) blowing agents and, if desired,
e) further auxiliaries and/or additives, the component b) comprises at least one recycled polyol which is formed by glycolysis of polyurethanes.

4 Claims, No Drawings

PRODUCTION OF RIGID POLYURETHANE FOAMS

The present invention relates to a process for producing rigid polyurethane foams having improved thermal stability.

The production of rigid polyurethane foams by reacting polyisocyanates with compounds containing groups capable of reacting with isocyanate groups, in particular polyols, has been known for a long time and described many times in the literature.

The rigid polyurethane foams which are produced in a customary manner usually have long-term use temperatures of about 120° C. These long-term use temperatures are sufficient for most applications of such foams. However, there are also applications in which the foams are subjected continually to relatively high temperatures, for example in the sheathing of pipes for long-distance heat transfer. The temperatures prevailing there result in destruction of the foams after only a short time, commencing with crack formation and ending with complete destruction of the foams.

The possibility of using polyurethane foams containing isocyanurate groups, known as polyisocyanurate foams (PIR foams) in place of pure polyurethane foams has hitherto proved unsuccessful in practice owing to the insufficient flowability of the reacting components and the excessively high brittleness of the PIR foams. During transport and laying of pipes sheathed in this way, this brittleness leads to crack formation and thus to a drastic worsening of the insulation properties. It is known from experience that the long-term heat distortion resistance is increased if high-functionality polyether polyols are used as polyol components. Such polyols are generally known and are usually prepared by reacting high-functionality initiator substances such as sugar alcohols with alkylene oxides. The high functionality gives a higher crosslinking density of the foams, which probably leads to the improved long-term thermal stability. A further possible way of improving the thermal stability of the rigid foams is increasing the NCO index in polyurethane production. This results in the formation of allophanate and biuret structures in the foam and thus to densification of the polyurethane network. However, a disadvantage is that the formation of isocyanurate structures, which leads to the abovementioned disadvantages, cannot be ruled out.

It is an object of the present invention to develop a process for producing rigid polyurethane foams which have good long-term stability at above 120° C. without resulting in impairment of the processing properties in foam production.

We have found that this object is achieved by producing rigid polyurethane foams by reacting polyisocyanates with polyols which are obtained by recycling.

The present invention accordingly provides a process for producing rigid polyurethane foams by reacting a) polyisocyanates with b) compounds containing at least two hydrogen atoms capable of reacting with isocyanate groups, in the presence of c) catalysts, d) blowing agents and, if desired, e) further auxiliaries and/or additives, wherein the component b) comprises at least one recycled polyol which is formed by glycolysis of polyurethanes.

The present invention also provides rigid polyurethane foams which can be produced by the process of the present invention. The invention further provides for the use of recycled polyols for producing rigid polyurethane foams having increased heat distortion resistance.

The recycled polyols used according to the present invention are prepared by glycolysis of polyurethanes using short-chain, in particular bifunctional and trifunctional, alcohols in a manner known per se. Particularly advantageous recycled polyols are those which have been prepared in the presence of glycidyl ethers and have a very low content of aromatic amines. The preparation of such compounds is described in EP-A-592 952. Furthermore, it has been found to be advantageous in the process of the present invention to use recycled polyols which have been prepared by glycolysis of rigid polyurethane foam.

The recycled polyols are preferably used in an amount of from 10 to 50% by weight, based on the sum of the components b to c. The use of smaller amounts of recycled polyols gives only a slight improvement in the long-term thermal stability, while addition of larger amounts leads to a worsening of the other mechanical properties of the foams.

In contrast to DE-A-44 11 864, which describes the use of recycled polyols from flexible polyurethane foams for producing open-celled rigid polyurethane foams which, owing to the open-cell content, are unusable for thermal insulation, the process of the present invention gives closed-cell foams having a very low thermal conductivity and good long-term heat resistance.

The main application area for the rigid polyurethane foams produced according to the process of the present invention is the sheathing of pipes, in particular long-distance heating pipes for dwellings and industry or pipelines for the transport of petrochemical products over great distances. For this application, the foams are required to be thermally stable at high temperatures for at least 30 years. The temperatures of the media transported in these pipes are at least 120° C., frequently above 140° C. To shorten the time taken to test the long-term thermal stability of the foams, the test method EN 253 (described below) which allows the long-term behaviour to be predicted was developed.

The process of the present invention makes possible not only an improvement in the long-term thermal stability of the rigid foams, but also a value-increasing reuse of, for example, production waste from polyurethane production or of used polyurethane by glycolysis and feeding the glycolysates to the polyurethane production process.

As regards the other components used in the process of the present invention, the following details may be provided:

a) Polyisocyanates used are the customary and known modified or unmodified polyisocyanates. In the process of the present invention, preference is given to using aromatic polyisocyanates, for example tolylene diisocyanate (TDI), preferably diphenylmethane diisocyanate (MDI), in particular mixtures of diphenylmethane diisocyanate and polyphenylpolymethylene polyisocyanates (crude MDI). The isocyanates can also be modified by introduction of urethane, allophanate, uretdione or other groups.

b) As compounds containing at least two hydrogen atoms capable of reacting with isocyanate groups, it is possible to use polyamines, but preferably polyols. Among the polyols, preference is given to polyesterols and, in particular, polyetherols. Particular preference is given to the 3- or higher-functional polyetherols customarily used for producing rigid polyurethane foams. These are usually prepared by addition of lower alkylene oxides, in particular ethylene oxide and/or propylene oxide, onto polyfunctional initiator substances. Initiator substances used for the production of rigid-foam polyetherols are, in particular, aromatic amines such as tolylenediamine (TDA) or diphenylmethanediamine (MDA) and its higher homologues, and also high-functionality alcohols such as sugar alcohols or starch, in particular sucrose and/or sorbitol. The customary polyetherols for rigid polyurethane foams usually have a functionality of from 3 to 8 and a hydroxyl number of from 200 to 800 mg KOH/g.

As catalysts (c), it is possible to use the customary and known polyurethane catalysts. Preference is given to tertiary amines, for example triethylamine, dimethylcyclohexylamine or diazabicyclo[2.2.2]octane (DABCO).

As blowing agent d), it is possible to use physically acting and/or chemically acting blowing agents. As chemically active blowing agent, use is made of, in particular, water which eliminates carbon dioxide in the reaction with the isocyanate groups. The water is primarily used in an amount of about 2% by weight, based on the sum of the components b) to d).

Physically acting blowing agents used are usually low-boiling inert liquids. Preference is given to hydrocarbons which may be halogenated. Particular preference is given to aliphatic and/or cycloaliphatic hydrocarbons having from 3 to 8 carbon atoms.

It has been found to be particularly advantageous to use pentane, in particular cyclopentane, with particular preference being given to using combinations of cyclopentane and water owing to the low thermal conductivity of the foams produced using these blowing agents. The physically acting blowing agents are usually added in an amount of <15% by weight, based on the sum of the components b) to e).

Auxiliaries and/or additives used are the customary and known flame retardants, foam stabilizers and/or fillers in the known amounts.

Further details regarding the components a) to c) may be found, for example, in the Kunststoffhandbuch Volume VII "Polyurethane", Carl-Hanser-Verlag Munich, 3rd edition 1993.

The following examples illustrate the invention.

EXAMPLE 1 (comparison)

Polyol component 70 g of a polyetherol derived from sorbitol and propylene oxide, hydroxyl number 496 mg KOH/g 9 g of polypropylene glycol, hydroxyl number 100 mg KOH/g 9 g of polypropylene glycol, hydroxyl number 256 mg KOH/g 2 g of dimethylcyclohexylamine 2 g of silicone foam stabilizer 1.8 g of water 11 g of cyclopentane Isocyanate component:

Crude MDI having an NCO content of 32% (Lupranat® M20S from BASF AG).

The polyol component and the isocyanate component were reacted at an NCO index of 130 in an open mold.

For the foam formed, a life of 30 years at 142° C. was determined in accordance with EN 253.

EXAMPLE 2

415 g of the foam from Example 1 were reacted at 210° C. with 519 g of diethylene glycol in the presence of 65 g of glycidyl ether. The glycolysate formed had a hydroxyl number of 600 mg KOH/g.

60 parts by weight of the polyol component from Example 1 and 40 parts by weight of the glycolysate were combined to form a polyol component and reacted, as described in Example 1, with the isocyanate component of Example 1. For the foam formed, a life of 30 years at 150° C. was determined in accordance with EN 253.

EXAMPLE 3

The procedure of Example 2 was repeated, except that the polyol component consisted of 80 parts by weight of the polyol component from Example 1 and 20 parts by weight of glycolysate.

For the foam formed, a life of 30 years at 148° was determined in accordance with EN 253.

Investigation of the thermal life in accordance with EN 253

The investigation criterion used in EN 253 is the testing of the axial and tangential shear strength of composite pipes at pipe temperatures of 23° C. and 140° C. after accelerated aging; aging parameters are 3600 h at +160°C. and/or 1450 h at +170° C.

According to the standard, the tube has to have the following mechanical properties after aging:

axial shear strength, 23° C. : 0.12 N/MM$^2$ axial shear strength, 140° C. : 0.08 N/mm$^2$ tangential shear strength, 23°C. : 0.20 N/mm$^2$ When the abovementioned limit values according to EN 253 are adhered to, it is possible to extrapolate the life to lower temperatures by means of the Arrhenius equation; the gradient of the Arrenhenius lines is laid down.

We claim:

1. A process for producing rigid polyurethanes foams comprising reacting
    a) polyisocyanates
    b) compounds containing at least two hydrogen atoms capable of reacting with isocyanate groups, in the presence of
    c) catalysts,
    d) blowing agents and, optionally,
    e) further auxiliaries and/or additives,
wherein the component b) comprises a recycled polyol which is obtained by glycolysis of a rigid polyurethane foam in the presence of glycidyl ether.

2. A process as claimed in claim 1, wherein the recycled polyol is obtained by glycolysis of a polyurethane in the presence of monofunctional and/or bifunctional glycidyl ethers.

3. A process as claimed in claim 1, wherein the recycled polyol is used in an amount of from 10 to 50 percent by weight, based on the sum of the components b) and c).

4. A rigid polyurethane foam produced according to the process as claimed in claim 1.

* * * * *